Nov. 5, 1929.　　P. MacGAHAN ET AL　　1,734,220
ELECTRICAL MEASURING INSTRUMENT
Filed March 6, 1928　　2 Sheets-Sheet 1

INVENTORS
Paul Mac Gahan and
Louis Stalder
BY
Wesley G. Carr
ATTORNEY

Nov. 5, 1929.  P. MacGAHAN ET AL  1,734,220
ELECTRICAL MEASURING INSTRUMENT
Filed March 6, 1928  2 Sheets-Sheet 2
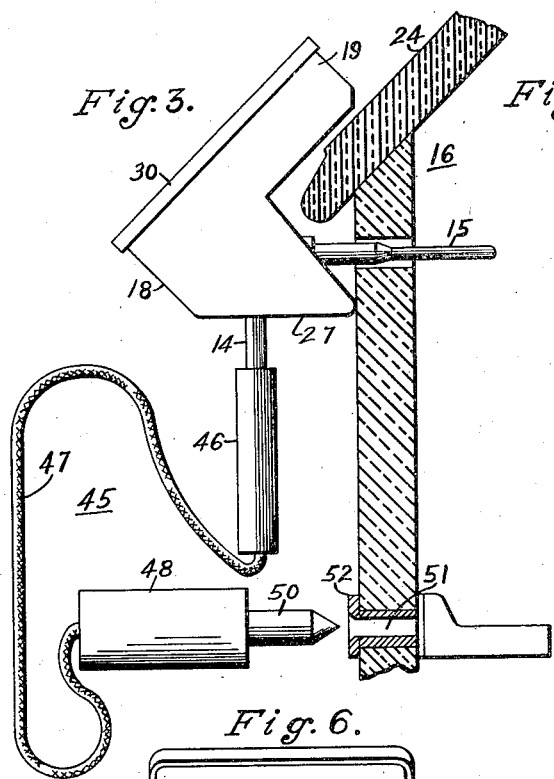
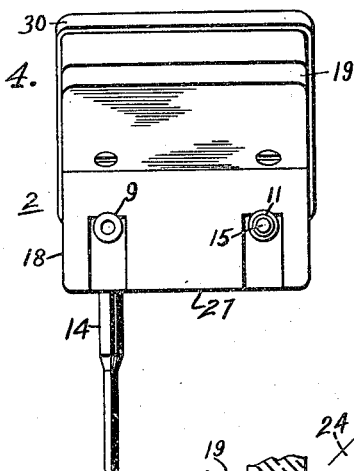
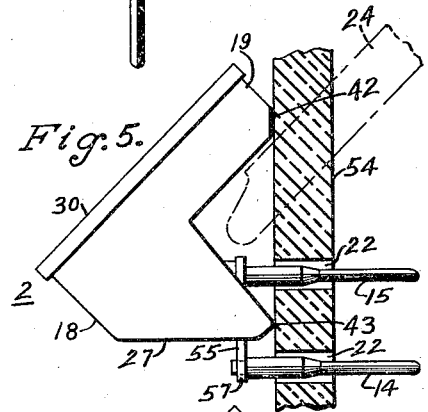
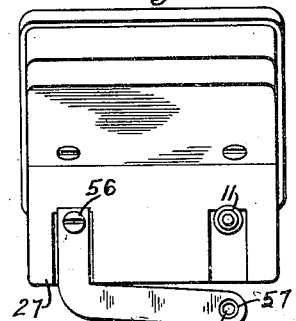
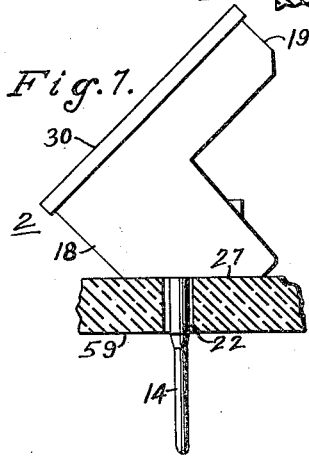
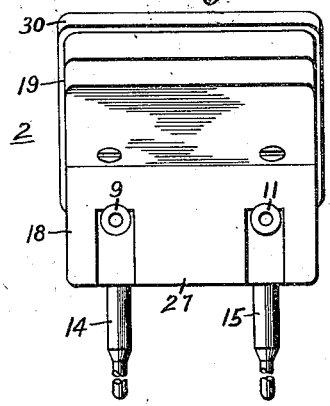
INVENTORS
Paul MacGahan and
Louis Stalder
BY
Wesley G. Carr
ATTORNEY Patented Nov. 5, 1929

1,734,220

UNITED STATES PATENT OFFICE

PAUL MacGAHAN, OF ORANGE, NEW JERSEY, AND LOUIS STALDER, OF TURTLE CREEK, PENNSYLVANIA, ASSIGNORS TO WESTINGHOUSE ELECTRIC AND MANUFACTURING COMPANY, A CORPORATION OF PENNSYLVANIA

ELECTRICAL MEASURING INSTRUMENT

Application filed March 6, 1928. Serial No. 259,495.

Our invention relates to electrical measuring instruments and it has for one of its objects to provide an instrument that shall be readily adapted for mounting on, and co-operation with, translating devices and supporting structure of different characters.

Another object of our invention is to provide a measuring instrument that shall have terminal portions adapted to extend in different directions relative to a dial portion thereof, in accordance with the directions of cooperating terminals to which the instrument may be attached, in order to maintain the dial portion in predetermined position.

Another object of our invention is to provide, for an instrument, a flexible extension element that shall have an outer-end terminal that may not remain in contact with a cooperating terminal, unless held by an operator, and that may not readily be attached thereto.

Another object of our invention is to provide an instrument casing that shall have a particular shape in relation to the shape of a supporting structure on which it is to be mounted.

Another object of our invention is to provide an instrument that shall have a pedestal or base in which certain working parts are enclosed, thereby permitting the construction of an instrument that is neat and ornamental and that appears to be smaller than an instrument of its capacity.

A further object of our invention is to provide an electrical measuring instrument that shall be simple and durable in construction, economical to manufacture and effective in its operation.

Heretofore, electrical measuring instruments, such as voltmeters and ammeters, have usually been enclosed in casings of cylindrical or rectangular box-like form having only one position for each terminal thereof. Also, these casings have usually contained all of the major working parts of the instruments, such as pointers, vanes, actuating coils and the like, and have, therefore, been of nearly uniform sizes for a given service or capacity.

Further, where projecting terminal pins are provided on instruments for cooperation with socket, jack or similar terminals, the pins have always, to the best of our knowledge, been associated with the instrument in fixed relation thereto. Also where the instruments are provided with socket terminals, these are in fixed direction and relation to the instrument.

The cylindrical or rectangular box-like casings, above mentioned, are not especially adapted for mounting on any particular object or device with which they are to cooperate. That is, they are not especially shaped or designed to interfit with a particular device to provide a more effective combined structure but are merely placed on the device in a convenient manner. Thus, the instrument and the device are usually readily recognized as separate units placed together, in contradistinction to the structure of our invention in which the instrument and the device appear and cooperate as one unit, as will hereinafter be described. This feature, as will appear, is not provided merely for ornamental purposes but has the utility of compactness and convenience of positioning and renders the operation of the combined devices more effective.

It is our aim to further overcome the above mentioned objections by providing an instrument in which the terminals may be variously adjusted to the terminals of different devices, at the same time maintaining the instrument dial in a given effective position for the operator, in which the instrument has its own pedestal, containing certain working parts, for mounting anywhere, and in which great flexibility of adjustment and protection against damage are features.

Accordingly, in practicing our invention, we provide a combined instrument casing and pedestal, terminals therefor and an extension element of such construction and relation to each other and to various devices and supports on which they are to be mounted, and with which they are to cooperate, as to attain all of the objects above set forth.

Figure 1 of the accompanying drawings is an enlarged sectional view of an instrument constructed in accordance with our invention, taken along the line I—I of Fig. 2, together with a portion of a supporting structure in which the instrument may be mounted, Fig. 2 is a rear elevational view, or view from the right, of the instrument shown in Fig. 1, parts being broken away and the supporting structure omitted.

Fig. 3 is a view, to substantially full scale and partially in side-elevation and partially in section, of an instrument and an extension element embodying our invention and a support in which they are mounted.

Fig. 4 is a rear elevational view of the instrument and its terminals as set up in Fig. 3.

Figure 1:
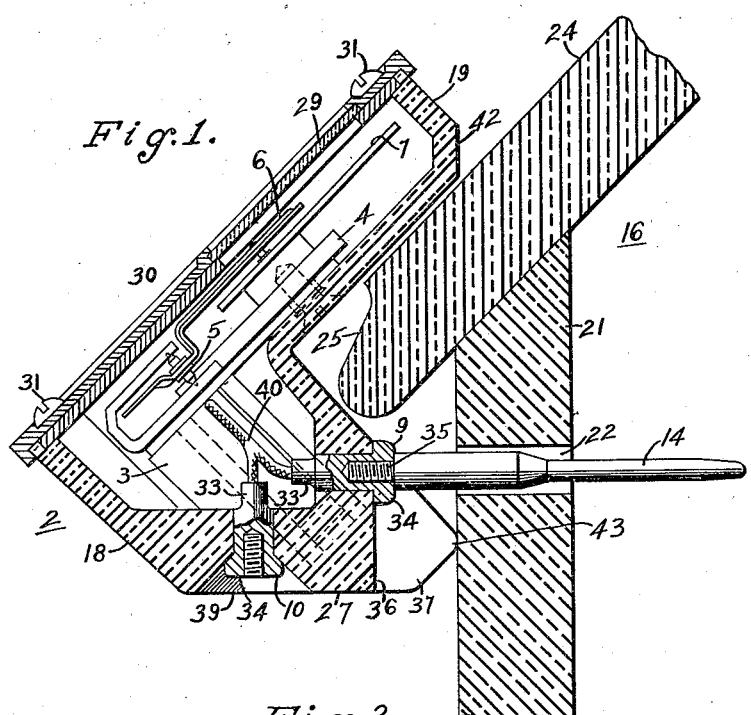
Figure 2:
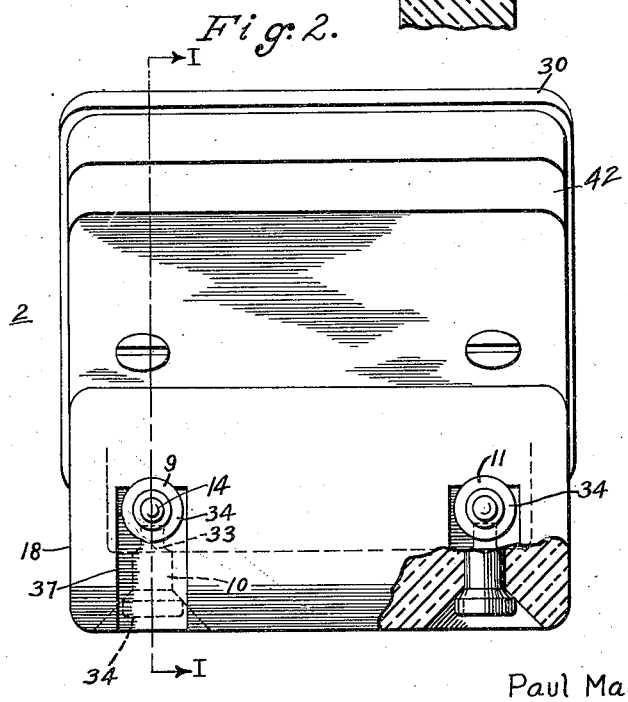

Figs. 5 and 6 are side and rear elevational views, respectively, of the instrument and its terminals in different set up or combination from those shown in Figs. 1 and 2, which correspond to those shown in Figs. 3 and 4, and Figs. 7 and 8 are views, similar to Figs. 5 and 6, of a still further set up between the instrument and its terminals.

Referring to Figs. 1 and 2, the instrument comprises, in general a combined pedestal and casing structure 2, an actuating coil 3, a permanent magnet 4, a movable element or vane 5, a pointer 6, a scale or dial 7, fixed terminal members or elements 9, 10, 11 and 12 and adjustable or removable terminal members or pins 14 and 15 for mounting the instrument on a translating device or supporting structure 16 and electrically connecting the instrument to terminals of a circuit (not shown).

The structure 2, which is preferably constructed of insulating composition material, although other materials may be used, comprises a base or pedestal portion 18 and a casing or dial-supporting portion 19 extending at substantially right angles to each other and having communicating inner spaces, the actuating coil 3 being disposed in the pedestal portion 18, and the other working parts of the instrument being disposed in the casing or dial portion 19.

The device or supporting structure 16 comprises a vertical wall 21 having openings 22 therein, for the reception of the pins 14 and 15, and a gabled roof, top-wall or cover member 24 having a particular angle to the wall 21 and an outer overhanging ledge 25.

In the above-described structures, the pedestal portion 18 extends, in general at a pronounced angle from a horizontal base surface 27 thereof and the dial portion 19, which projects laterally from the outer end of the pedestal portion 18, overhangs the ledge 25 and lies in a plane substantially parallel to the plane of the gable portion 24.

An operator, therefore, located so that his line of vision may be substantially normal to the planes of the portion 19 and the dial 7 may also effectively view and operate control devices (not shown) on the vertical wall 21 and the gable portion 24.

The structure 2 further comprises a window member 29 held in position on the portion 19 by an ornamental plate or frame member 30 and screws 31.

The fixed terminal members 9, 10, 11 and 12 are preferably in the form of bushings, press fitted in position in openings provided in the base portions 18, having reduced inner ends 33 to provide clearance between them, and enlarged outer ends 34 to limit the inner positions thereof. The outer ends 34 are drilled and tapped to receive screw-threaded shank portions 35 of the pins 14 and 15.

The enlarged outer ends 34 of the terminal members 9 and 11 have flat annular inner surfaces to fit vertical plane surfaces 36 of vertical slots 37 in the portion 18, and the enlarged outer ends of the terminals 10 and 12 have beveled or inclined annular inner surfaces to fit similar surfaces of counter- sunk openings 39 in the portion 18. The fixed terminals 9 and 10 are connected together and to one terminal of the actuating coil 3 by conductors 40, and the fixed terminals 11 and 12 are similarly connected together and to the other terminal of the coil 3 by conductors (not shown).

A vertical surface 42 and a portion 43 of the structure 2 are in vertical alignment for a purpose to be hereinafter set forth.

In the structure described in connection with Figs. 1 and 2, the pins 14 and 15 are connected to the fixed terminals 9 and 11 directly across the coil 3 and are disposed in a horizontal plane. Also, by reason of the fact that the pins 14 and 15 are held by corresponding terminals (not shown) and the part 43 rests against the wall 21, the dial portion 19 is held at a given angle. Thus, there are three conditions or features, namely, the angle of the dial portion 19, the plane or relation of the pins 14 and 15 and the condition of the instrument for electrical service which may be varied relatively, as will be pointed out herein. However, in each combination of these features, the angle of the dial portion remains the same.

Figs. 3 to 8, inclusive, in which corresponding parts are designated by corresponding reference characters, show the instrument parts in various other combinations.

In Fig. 3, the electrical condition of the instrument is changed by removing the positive terminal pin 14 from the fixed terminal 9, connecting it to the fixed terminal 10 and, in turn, connecting an extension element 45 to the pin 14.

The extension element 45 comprises a socket terminal portion 46, for attachment to the pin 14, a flexible conductor 47, a resistor element 48 and a contact portion or projection 50. When the element 45 is thus connected in series with the coil 3 between the pin 15 and the portion 50, the scale reading or calibration of the instrument is changed to adapt the instrument to higher voltages.

The contact portion 50 is of cylindrical shape having a conical pointed end by which it may be placed in an opening 51 in a jack bushing 52 in good electrical contact therewith. The diameter of the portion 50 is greater than the diameter of the opening 51 so that only the pointed end of the portion 50 may enter the opening. Thus, electrical contact between the parts 50 and 52 may only be maintained by holding them together and these parts are so constructed as to render permanent engagement thereof difficult. This feature is provided to protect the instrument against the relatively high voltage which may be placed across the instrument in this combination, as only momentary contact of the parts is usually desired.

Fig. 4 is a rear view of the instrument as shown in Fig. 3, with the structure 16 and the extension element 45 omitted to illustrate more clearly the position of the pins 14 and 15 in the combination described in connection with Fig. 3.

Figs. 5 and 6 are side and rear views, respectively, of another combination of the parts where a vertical wall 54 is higher than the wall 21, and the openings 22 for the reception of the pins 14 and 15 are in a vertical plane instead of a horizontal plane, as in the previous figures. In the combination, the surface 42 and the portion 43 engage the wall 54 to assist in holding the instrument firmly in position. The combination may be the same also, where the vertical plane and the gable portion 24, shown by broken lines, is in the position shown in Figs. 1 and 3.

In this combination, an angle extension element 55 is connected, as by a screw 56, to the fixed terminal 9 and has a screw threaded opening 57 at its other end for the reception of the pin 14.

Figs. 7 and 8 are views, similar to Figs. 5 and 6, of the parts as combined for mounting the instrument with its horizontal base surface 27 firmly against a horizontal member 59 having the pin-receiving openings 22 vertically disposed therein. In this combination, the pins 14 and 15 are attached to the fixed terminals 10 and 12.

Various other combinations embodying the pins 14 and 15, the extension element 45 and the angle extension member 55 are readily suggested but it is believed that the combinations given are sufficient to illustrate the wide choice of uses and flexibility of adjustment provided. By providing short screw terminals for the fixed terminals 9, 10, 11 and 12, ordinary flexible conductors of any length may be attached to the instrument to adapt it to any of the uses for which a usual instrument or meter is adapted.

While we have shown and described particular forms of our invention, changes may be effected therein without departing from the spirit and scope thereof, as indicated in the appended claims.

We claim as our invention:

1. A meter structure comprising a dial and a cooperating pointer disposed in given substantially parallel planes, a terminal structure including receiving means having axes in different planes and terminal projections for attachment to said receiving means along any of said axes.

2. A meter structure comprising a dial and a cooperating pointer disposed in given substantially parallel planes, a terminal structure including receiving means, an extension member for attachment to one of said receiving means, a terminal projection for attachment to another of said receiving means and a terminal projection for attachment to said extension member.

3. A meter structure comprising a dial and a cooperating pointer disposed in given substantially parallel planes, a terminal structure including receiving means, an extension member of substantially L-shape having one arm for attachment to one of said receiving means, a terminal projection for attachment to the other arm of said extension member and a terminal projection for attachment to another of said receiving means.

4. A measuring instrument comprising a casing including a base portion and an inclined dial-face portion, and terminal means on said base portion adapted for engagement with cooperating terminals extending in different directions, the arrangement of parts permitting the dial-face portion to retain its angle of inclination irrespective of the direction of the terminals.

5. A measuring instrument comprising a casing including a base portion and an inclined dial-face portion permitting the base portion to rest adjacent to a vertical side of a gabled support and the dial-face portion to overhang the gabled portion of the support.

6. A measuring instrument comprising a casing including a base portion and an inclined dial-face portion permitting the base portion to rest adjacent to a vertical side of a gabled support and the dial-face portion to overhang the gabled portion of the support, said base portion also having a horizontal bottom surface permitting the instrument to rest on a horizontal surface and the dial-face portion to retain its angle of inclination.

7. A measuring instrument comprising a casing including a base portion having vertical and horizontal surfaces and an inclined dial-face portion, terminal means in said base portion having vertical and horizontal receiving means, and terminal projections for cooperation with said receiving means to connect the instrument to terminals in a vertical side of a gabled support with the vertical surface of said base member against said vertical side and the dial-face portion overhanging the gabled portion of said support, said terminal projections also cooperating with said receiving means to connect the instrument to vertical terminals in a horizontal support against which the horizontal surface of the base portion rests.

8. A measuring instrument comprising a casing including a base portion extending in general at an angle to the horizontal and a dial-face portion extending at substantially right-angles to said base portion, and terminals adapted to project horizontally and vertically from said base portion.

9. A measuring instrument comprising a casing including a base portion extending in general at an angle to the horizontal and a dial-face portion extending at substantially right-angles to said base portion, said base portion being shaped so as to coact symmetrically with either a horizontal or a vertical surface, and terminals adapted to project vertically and horizonally from said base portion.

In testimony whereof, we have hereunto subscribed our names this 2nd day of February, 1928.

PAUL MacGAHAN.
LOUIS STALDER.